(12) United States Patent
Uemura

(10) Patent No.: US 9,412,352 B2
(45) Date of Patent: Aug. 9, 2016

(54) RECORDING AUDIO IN ASSOCIATION WITH DISPLAY CONTENT

(71) Applicant: Yamaha Corporation, Hamamatsu-shi, Shizuoka-ken (JP)

(72) Inventor: Norihiro Uemura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 14/304,249

(22) Filed: Jun. 13, 2014

(65) Prior Publication Data

US 2014/0366709 A1  Dec. 18, 2014

(30) Foreign Application Priority Data

Jun. 17, 2013  (JP) .................................. 2013-126436

(51) Int. Cl.
*G10H 1/18* (2006.01)
*G10H 1/00* (2006.01)
*G11B 27/10* (2006.01)
(Continued)

(52) U.S. Cl.
CPC .. *G10H 1/18* (2013.01); *G09B 5/06* (2013.01); *G10G 1/00* (2013.01); *G10G 3/00* (2013.01); *G10H 1/0008* (2013.01); *G10H 1/0025* (2013.01); *G11B 27/10* (2013.01); *H04N 21/47217* (2013.01); *G10H 2220/015* (2013.01); *G10H 2220/091* (2013.01); *G10H 2220/096* (2013.01); *G10H 2220/211* (2013.01); *G10H 2220/236* (2013.01); *G10H 2220/241* (2013.01); *G10H 2230/015* (2013.01)

(58) Field of Classification Search
USPC .................................................. 84/615, 653
See application file for complete search history.

(56) References Cited

U.S. PATENT DOCUMENTS 6,275,222 B1   8/2001  Desain
2004/0225502 A1*  11/2004  Bear ....................... G10L 15/26
                                                         704/270
(Continued)

FOREIGN PATENT DOCUMENTS

EP      2251871 A1    11/2010
JP      H09320148 A   12/1997
(Continued)

OTHER PUBLICATIONS

European Official Communication dated Jul. 14, 2015, for EP Application No. 14171747.0, five pages.
(Continued)

*Primary Examiner* — David Warren
(74) *Attorney, Agent, or Firm* — Morrison & Foerster LLP

(57) ABSTRACT

In an ensemble performance, performance lesson or the like, a musical score (display content) is displayed and input audio is recorded. The input audio includes notes, comments or the like uttered by a human player or an instructor. During recording of the input audio is received a user input designating a desired time position on the musical score displayed on the display device. A recording time of the input audio based on a time point at which the user input has been received and the time position on the musical score designated by the user input are stored into a storage device in association with each other. An icon is displayed in association with the time position on the musical score designated by the user input. Once the icon is selected, voice based on the recording time recorded in association with the icon is reproduced to sound the comments, etc.

14 Claims, 7 Drawing Sheets

(51) Int. Cl.
*H04N 21/472* (2011.01)
*G10G 1/00* (2006.01)
*G10G 3/00* (2006.01)
*G09B 5/06* (2006.01)

(56) References Cited

U.S. PATENT DOCUMENTS

| | | | |
|---|---|---|---|
| 2007/0089591 A1* | 4/2007 | Boys | G09B 5/06 |
| | | | 84/609 |
| 2007/0119292 A1 | 5/2007 | Nakamura | |
| 2008/0060507 A1 | 3/2008 | Welchering | |
| 2008/0190271 A1* | 8/2008 | Taub | G10H 1/0058 |
| | | | 84/645 |
| 2009/0251440 A1 | 10/2009 | Edgecomb et al. | |
| 2011/0289404 A1* | 11/2011 | Fleur | G06F 17/241 |
| | | | 715/255 |
| 2012/0057842 A1* | 3/2012 | Caligor | G10H 1/0058 |
| | | | 386/201 |
| 2013/0031220 A1* | 1/2013 | Moncavage | G06Q 10/10 |
| | | | 709/219 |
| 2013/0319209 A1* | 12/2013 | Good | G09B 15/04 |
| | | | 84/483.2 |
| 2014/0075281 A1* | 3/2014 | Rubin | G06F 17/241 |
| | | | 715/230 |
| 2014/0366709 A1* | 12/2014 | Uemura | G10H 1/0025 |
| | | | 84/603 |
| 2015/0255057 A1* | 9/2015 | Levy | G10L 13/02 |
| | | | 704/260 |

FOREIGN PATENT DOCUMENTS

JP    2007-108292 A    4/2007
WO    WO-2012/035597 A1    3/2012

OTHER PUBLICATIONS

Extended European Search Report dated Aug. 19, 2014, for EP Application No. 14171747.0, eleven pages.

* cited by examiner

RECORDING AUDIO IN ASSOCIATION WITH DISPLAY CONTENT

BACKGROUND

The present invention relates to visually displaying display content, such as a musical score, representative of a time-wise or temporal transition of a music performance, and recording audio including comments etc. related to the display content.

There have heretofore been known various electronic apparatus having a function for displaying display content, such as a musical score. Among examples of electronic apparatus having such a display function is a musical score editing apparatus constructed to display on a screen a musical score that is a representative example of music performance content and add a visible explanatory memo or note to the displayed musical score (see, for example, Japanese Patent Application Laid-open Publication No. 2007-108292). The musical score editing apparatus disclosed in the No. 2007-108292 permits efficient impartment of explanatory graphics and insertion of explanatory text by, among other things, the arrangements that:

A. in response to a user only designating a type of an explanatory graphic and pointing to a particular symbol for which an explanatory memo or note is to be made, a mark of a size matching a size of the particular symbol is added;

B. in response to the user surrounding a particular symbol, for which an explanatory memo or note is to be made, with a line handwritten using a pointing device, a standard explanatory graphic surrounding the particular symbol is displayed; and C. if an explanatory statement is to be input in text within an explanatory graphic, text input is started in response to the user only double-clicking a mouse on a desired text input position without switching from a graphic input mode to a text input mode.

Further, in recent years, tablet-type portable terminals (hereinafter referred to as "tablet terminals") have been in widespread use. Thus, in many cases today, a tablet terminal is brought to a place where a musical instrument is to be played, and a musical score is displayed on the tablet terminal to be used in place of a paper musical score.

In a case where there is some other person, such as a human player or instructor, than a particular person in an ensemble performance, performance lesson or the like, the particular person may sometimes write down, or take a note of, instructions of the other person on a musical score. If, in such a case, a musical score displayed on a tablet terminal is used, the particular person will input information to be written down in letters/characters (i.e., by text input) after or without imparting a mark to a designated position on the displayed musical score. However, even with the technique disclosed in connection with the conventionally-known musical score editing apparatus, mark imparting and text inputting efficiency can be enhanced only to some degree; besides, it would take considerable time and labor to select a type of a mark, and also it would be difficult for the person to execute the text input while holding a musical instrument.

Also known is a technique in accordance with which, when voice or audio recording is to be performed in a conference room or the like, an index mark or audio bookmark is recorded in association with a desired time position in recorded data so that, in reproduction, the recorded data at the time position imparted with such an index mark or audio bookmark can be selectively reproduced (known, for example, from Japanese Patent Application Laid-open Publication No. HEI-09-320148 or U.S. Patent Application Publication No. 2007/0119292). Further, U.S. Patent Application Publication No. 2009/0251440 discloses that a memo or note handwritten-input or text-input is recorded as additional content in synchronism with the audio bookmark so that the additional content (memo or note) too can be reproduced and displayed as the recorded data at the audio-bookmarked time position is reproduced. However, the technique is not arranged to impart the audio bookmark in association with a particular time position within display content, such as a musical score, representative of a temporal transition of a music performance.

SUMMARY OF THE INVENTION

In view of the foregoing prior art problems, it is an object of the present invention to provide an improved technique which allows an instruction, comment or the like to be recorded with ease in association with a display of display content that is representative of a temporal transition of a music performance.

In order to accomplish the above-mentioned object, the present invention provides an improved computer-implemented method comprising: displaying, on a display device, display content representative of a temporal transition of a music performance; recording input audio; receiving, during recording of the input audio, a first user input designating a desired time position on the display content displayed on the display device; and storing, into a storage device, a recording time of the input audio based on a time point at which the first user input has been received and the time position on the display content designated by the first user input, in association with each other.

According to the present invention, during recording of the input audio is received the first user input designating a desired time position on the musical score displayed on the display device. Because the recording time of the input audio based on the time point at which the first user input has been received and the time position on the display content designated by the first user input are stored into the storage device in association with each other, i.e., because information which the user wants to record is recorded as sound or audio (e.g., human voice) rather than being input onto the displayed display content as letters/characters or symbols, an instruction, comment or the like can be recorded, through a simple operation, in association with the display content. Further, because a desired time position on the display content can be designated by the first user input independently of the time point at which the first user input has been received, i.e. the recording time of the audio, association or relationship between the recorded audio (instruction, comment or the like) and the time position of the music performance represented by the display content can be determined as desired, which is very convenient.

In an embodiment, the method of the present invention may further comprises adding, to the display content displayed on the display device, a mark related to the time position designated by the first user input. With such arrangements, the mark is imparted to a position on the display content associated with the designated time position, and thus, the user is allowed to know at first sight to which portion of the display content a portion of the recorded audio to be listened to again corresponds.

In an embodiment, the method further comprises: receiving a second user input for moving a position of the mark, added to the display content displayed on the display device, to a different time position; and changing, in response to movement of the position of the mark, relationship or association between the recording time and the time position, stored in the storage device, so that the recording time of the input audio, based on the time point at which the first user input has been received, is associated with the time position moved by the second user input. Such arrangements are very user-friendly and convenient in that, by moving the mark imparted to the display content, they can change the association or relationship between the recorded audio (instruction, comment or the like) and the time position of the music performance represented by the display content.

In an embodiment, the second user input may include dragging the mark on a screen of the display device. Further, in an embodiment, the display content comprises a plurality of pages a portion of which is displayable at a time on the screen of the display device, and the second user input may include an input for switching a page of the display content, displayed on the screen of the display device, to another page and an input for moving the position of the added mark to a desired time position on the other or switched-to page of the display content.

In an embodiment, the method may further comprise: receiving a third user input for selecting the time position on the display content; and reproducing the recorded audio on the basis of the recording time associated with the time position on the display content selected by the third user input. By selecting the time position designated in the display content (i.e., for which association has been recorded), such arrangements can reproduce the audio based on the recording time associated with the selected time position, and thus, the audio (instruction, comment or the like) which the user wants to listen to can be reproduced promptly in response to the time position selection in the display content.

In an embodiment, the reproducing the recorded audio may include starting reproduction of the recorded audio at a recorded position a predetermined time before the recording time associated with the time position on the display content selected by the third user input. When the first user input has been made later than a start time pint of the audio (instruction, comment or the like) which the user wants to listen to (as is often the case with a real-time audio input), such arrangements can perform the reproduction from the start of the audio (instruction, comment or the like).

The present invention may be constructed and implemented not only as the method invention discussed above but also as an apparatus invention. Also, the present invention may be arranged and implemented as a software program for execution by a processor, such as a computer or DSP, as well as a non-transitory computer-readable storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Figure 1:
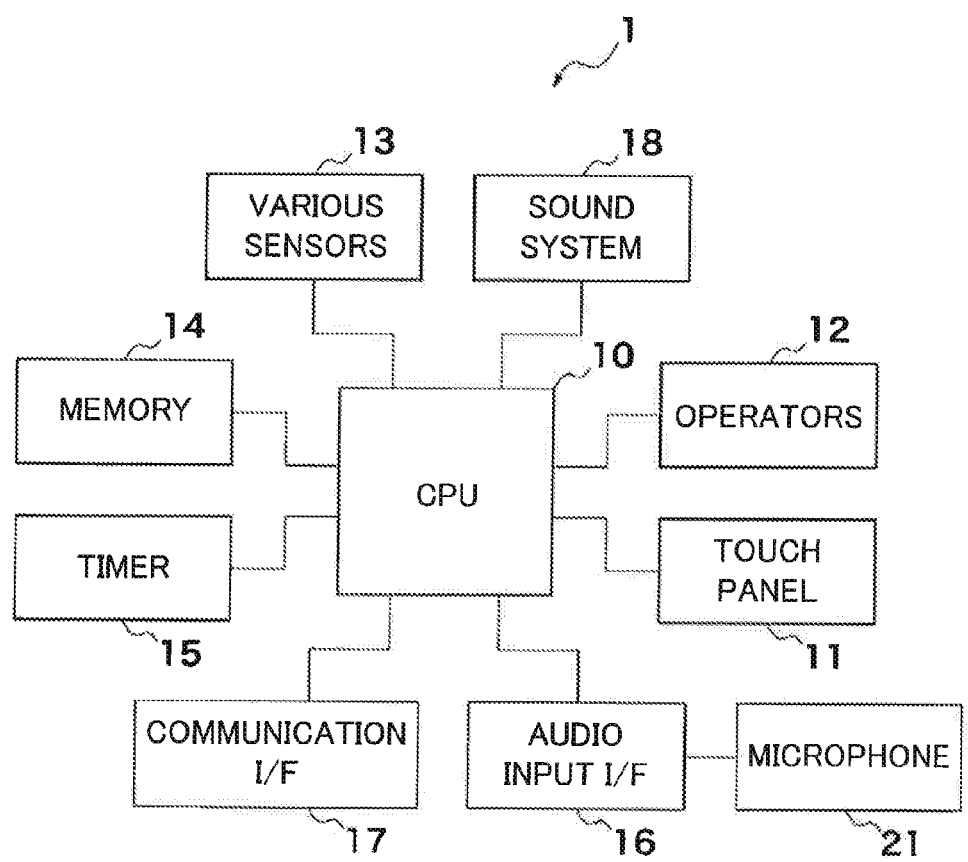
FIG. 1 is a block diagram showing a general setup of a tablet terminal to which is applied a display apparatus according to an embodiment of the present invention.

FIG. 1 is a block diagram showing a general setup of a tablet terminal 1 to which is applied a display apparatus according to an embodiment of the present invention.

As shown in FIG. 1, the tablet terminal 1 includes a CPU (central processing unit) 10 for performing overall control on the entire tablet terminal 1. To the CPU 10 are connected a touch panel 11, operators 12, various sensors 13, a memory 14, a timer 15, an audio input interface (I/F) 16, a communication interface (I/F) 17 and a sound system 18.

The touch panel 11, which is of a conventional type employed in ordinary tablet terminals, has both a function as a display device and a function as an input device. A user can designate a desired position on a display screen of the touch panel 11 by touching the touch panel 11, for example, with its (his or her) own finger. Once a position on the display screen is designated by the user touching the touch panel 11, position information (coordinates) of the touched position is transmitted from the touch panel 11 to the CPU 10, so that the CPU 10 performs processing corresponding to the position information; needless to say, the CPU 10 may not perform any processing depending on the designated position. Further, on the display screen are displayed not only a plurality of software buttons for instructing respective behavior corresponding to various functions but also display content. In the instant embodiment, the "display content" is representative of a temporal transition of a music performance, more specifically a musical score expressed with a staff notation (see FIG. 2C to be described later). The "music performance" comprises various elements, such as notes and rests, constituting a musical score, and the "temporal transition" means relationship between beats and measures defining temporal progression of a music piece and various elements, such as notes and rests.

Of course, the "music performance" may comprise any other elements than notes, rests etc. constituting a musical score, such as lyrics or words, chord names and the like to be referenced by the user (human player) at the time of the performance. Further, the "temporal transition of a music performance" may be displayed with other than the staff notation, such as a tablature, chord score, lyrics display, configuration table of a music piece, or the like. Display positions according to a temporal transition of a music performance indicated by display content displayed on the touch panel 11 (i.e., coordinate positions on the touch panel) correspond to time positions in the display content indicative of the temporal transition of the music performance.

The operators 12 are different input elements from the software buttons displayed on the touch panel 11, and typical examples of the operators 12 include a power switch and a reset switch (both not shown).

The various sensors 13 include, among other things, a geomagnetic sensor, a GPS (Global Positioning System), an acceleration sensor capable of detecting gravity acceleration as well, an ultrasonic sensor, a camera, and a photo sensor for detecting ultraviolet or visible light.

The memory 14 includes: a ROM (Read-Only Memory) storing therein control programs and various application programs to be executed by the CPU 10, and various data including image data to be used in screen display by the programs and audio data to be used in sound generation; and a RAM (Random Access Memory) temporarily storing therein various data including the aforementioned image data and audio data, various input information and results of arithmetic operations. In the instant embodiment, a rewritable non-volatile memory, more specifically a flash memory, is employed as the ROM so as to permit, as necessary, addition, deletion or update of any of the control programs, various application programs and various data.

The timer 15 counts various times, such as ones to signal interrupt timing for timer interrupt processes.

The audio input I/F 16, which connects a microphone 21 to the tablet terminal 1, converts ambient analog audio signals, input via the microphone 21, into digital audio signals (audio data) and temporarily stores the digital audio signals (audio data) into a buffer (not shown).

The communication I/F 17 connects the tablet terminal 1 to a communication network, such as the Internet, to perform communication (transmission and reception) of various data with other equipment connected to the communication network. If a server computer (not shown) is connected to the tablet terminal 1 as the other equipment, addition, deletion or update of any of the control programs etc. may be performed via the server computer. In this case, the communication interface 17 is used to download, from the server computer, various programs and various data. The tablet terminal 1, which is a client here, transmits a command requesting download of a program or data to the server computer via the communication I/F 17 and the communication network. Upon receipt of the command, the server computer delivers the requested program or data to the tablet terminal 1 via the communication network, so that the tablet terminal 1 receives the program or data via the communication I/F 17 and stores the received program or data into the flash memory of the memory 14. In this way, the downloading is completed.

The sound system 18 comprises, for example, a DAC (Digital-to-Analog Computer), an amplifier, a speaker, etc. The sound system 18 converts into audio each tone signal generated as the CPU 10 executes any of the control programs and various application programs. In the instant embodiment, such a tone signal is generated by the CPU 10 executing a tone generator program, i.e. by a so-called "software tone generator". Needless to say, a tone signal may be generated by a hardware tone generator rather than such a software tone generator; alternatively, a tone generator partly constructed of hardware with the remaining part constructed of software may be employed in the instant embodiment.

Whereas the instant embodiment has been described above in relation to the case where the tablet terminal 1 is employed as the display apparatus, the present invention is not so limited, and a portable type note PC (Personal Computer), a PDA (Personal Digital Assistance) or the like may be employed as the display apparatus. Although it is desirable that the display apparatus be of a portable type because the portable-type display apparatus can be brought to a place for a music performance in order to display a musical score in that place, the display apparatus may be an installed-type PC if portability is made unnecessary by setting, as the place for the music performance, a place where the display apparatus is installed. Further, the display apparatus of the present invention may be constructed not only in a general-purpose apparatus but also in a dedicated apparatus comprising only minimum necessary elements capable of practicing the present invention.

Further, whereas the instant embodiment has been described above as employing the touch panel 11 functioning both as a display device and as an input device, the present invention is not so limited, and the display device and the input device may be constructed separately from each other. In such a case, a desired position on the display screen of the display device may be designated by the user moving a cursor via a pointing device (mouse, wheel, touch pad or the like) provided as the input device.

Figure 2:
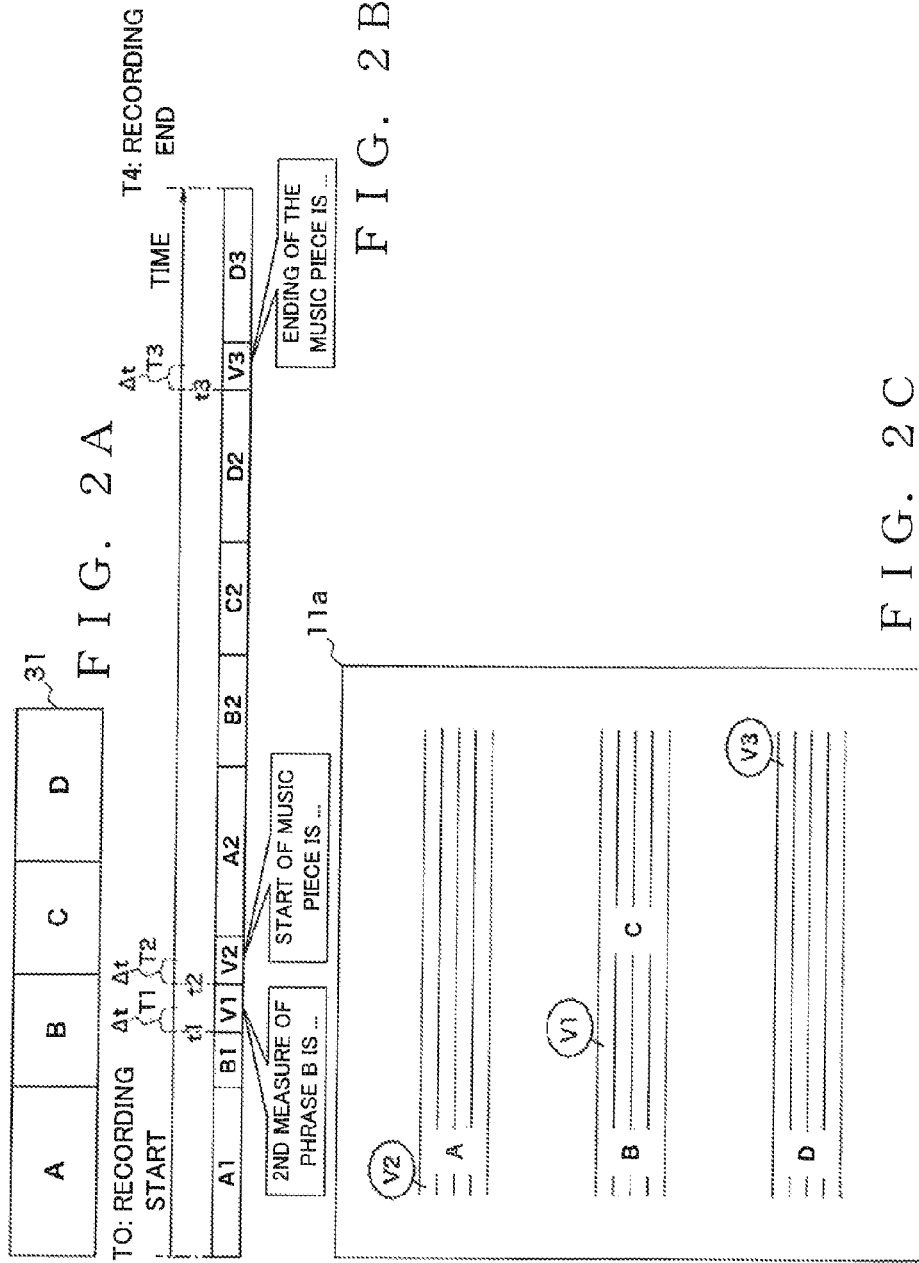
FIG. 2A is a diagram showing an example construction of a music piece selected by a user.
FIG. 2B is a diagram showing example recording manner in the instant embodiment.
FIG. 2C is a diagram showing an example of a musical score displayed on a screen.

Next, control processing performed by the tablet terminal 1 constructed in the aforementioned manner will be outlined with reference to FIG. 2 and then detailed with reference to FIGS. 3 and 4.

FIG. 2A shows an example construction of a music piece 31 selected by the user for display of a musical score, and, as shown, the selected music piece 31 comprises four phrases A to D. Display content is prepared in advance for display of the musical score of the selected music piece 31. Namely, in the instant embodiment, the display content comprises musical-score displaying data (musical score data). Among typical examples of the musical score data are musical score logic data and musical score image data. The musical score logic data comprises data necessary for displaying various score-constituting elements, such as notes, rests and other musical symbols; more specifically, it includes type information indicative of types of such various score-constituting elements and position information indicative of display positions of the elements. The musical score image data, on the other hand, is of such a type that can display a musical score by the image data being displayed as-is. Examples of a data format of the musical score image data include the BMP (bitmap), JPEG (JointPhotographic Expert Group), GIF (Graphics Interchange Format), TIFF (Tagged Image File Format), PDF (Portable Document Format), etc. Although any desired one of the musical score logic data, musical score image data, etc. may be employed as the musical score data, let it be assumed, for convenience of description, that the musical score logic data is employed as the musical score data in the instant embodiment. A visible musical score can be drawn by a drawing process being performed on the basis of the musical score logic data.

Once the user selects a music piece 31 and instructs display of a musical score of the selected music piece 31, the CPU 10 reads out the musical score data of the selected music piece 31 from the flash memory, stores the read-out musical score data into a selected music piece storage area (not shown) secured in the RAM and displays the musical score on the touch panel 11 on the basis of the thus-stored musical score data. FIG. 2C shows a screen 11a having the musical score displayed thereon. Note, however, that, if the musical score of the selected music piece 31 is displayed for the first time, voice (audio) memo icons V1 to V3 are not displayed on the displayed musical score because no voice (audio) memo exists yet.

Such display of the musical score of the selected music piece 31 is implemented by the processor (CPU 10) executing a module included in the application program pertaining to the instant embodiment and configured to display on a display device display content representative of a temporal transition of a music performance.

Once a recording start button (not shown) on the musical score screen 11a of FIG. 2C (where voice memo icons V1 to V3 are not displayed yet) displayed on the touch panel 11 is touched by the user in order to record a music performance, the CPU 10 stores ambient audio data, input via the microphone 21 and the audio input I/F 16, into a recorded data storage area (storage section) in the RAM via the buffer of the audio input OF 16 to thereby record the ambient audio data. Note that the recorded audio data (recorded data) may be of any desired format, such as the WAV (RIFF Waveform Audio Format) or AIFF (Audio Interchange File Format), and that the recording audio data may be stored after being converted into a compression format, such as the MP3 (MPEG Audio Layer-3). Further, the storage area for the recorded audio data may be other than the RAM, such as an external server computer or recording medium, as long as the recording audio data can be stored into and read out from storage area.

Such recording, responsive to a touch of the recording start button, of audio data input via the audio input I/F 16 is implemented by the processor (CPU 10) executing a module included in the application program pertaining to the instant embodiment and configured to record input audio.

FIG. 2B is a diagram showing example audio recoding performed in the instant embodiment. Let it be assumed here that FIG. 2B shows a recording of all music performances and conversation voice recorded when the user attended a private stringed instrument lessen. The recording is started at time point T0, and then music performance is started. A series of rectangular blocks "A1" to "D3" in FIG. 2B indicates a series of recorded data that continued to be recorded without a stop operation. Initial letters "A" to "D" in the recorded data blocks correspond to the phrases A to D shown in FIG. 2A, and suffixes "1" to "3" each indicate a number of times of performance executed after the start of the recording. Note that the "number of times of performance" does not indicate the number of times of performance per phrase, but it indicates the number of times of performance resumed after temporary stoppage. Thus, in the illustrated example of FIG. 2B, there are no "C1" and "D1" for the phrases C and D, because the performance was temporarily stopped due to teacher's or instructor's comments V1 and V2 inserted in the first performance (B1) of the phrase B and then the performance returned back to the phrases A and B (i.e., A2 and B2) and proceeded to the phrases C and D (i.e., C2 and D2). Further, "V1" to "V3" indicate audio or voice data uttered by the instructor. Such voice data uttered by the instructor includes a comment, instruction, advice or the like given by the instructor. Of course, a comment or the like uttered by the user itself may be included in such voice data. Whereas, in the illustrated example, the recorded data is displayed as divided in accordance with contents of the recording, such as "A1", "B1" and "V1", for convenience of description, blocks "A1" to "D3" in FIG. 2B actually indicate a series of recorded data as noted above. In the instant embodiment, the recording itself is continued from the start of the lessen (time point T0) all the way to the end of the lessen (time point T4). By performing so-called continuous recording as noted above, the instant embodiment can eliminate a need for the user to perform a recording operation each time an instruction or the like is received from the instructor.

The following outline control processing performed by the tablet terminal 1 (CPU 10) with reference to the progression of the recording illustratively shown in FIG. 2B. Following the start of the recording at time point T0, the user performs the phrase A in a first performance. Then, once the user proceeds to the phrase B, the user is stopped by the teacher or instructor from performing, and the instructor gives an instruction about a second measure of the phrase B; voice data V1 represents instructor's voice giving such an instruction. The user performs a marking operation (first user input) by touching a position on the musical score, so that the user can listen to the voice data V1 promptly after the end of the lessen. In response to the user's marking operation (first user input), not only the voice memo icon V1 is displayed at the user-touched position, but also a counted time T1 at a time point when the touch operation has been made is detected as a recording time of the voice (audio) data related to the touch (i.e., marking operation) (such a recording time will be referred to also as "touch-time-representing recording time") and then stored into the storage device (i.e., the RAM in the memory 14) in association with the voice memo icon V1. At that time, a coordinate position, on the screen, where the voice memo icon V1 is displayed is also detected and stored into the storage device in association with the voice memo icon V1 and the recording time of the voice data. Because the displayed musical score, i.e. display content, is representative of a temporal transition of the music performance, the coordinate position, on the musical score i.e. display content, of the voice memo icon V1 relates to, or is associated with, a time position on the displayed musical score i.e. display content. The voice memo icon V1 is an example of a "mark" indicating that recorded voice is currently associated with the mark (so are the other voice memo icons V2 and V3). Such marks may each be displayed in any other desired form than an icon, such as by changing a displayed color of a note located at a designated position, changing a thickness of a portion of the staff at the designated position or the like, as long as the user can readily recognize the mark. Further, the "user-touched position" may be any desired position on the musical score 11a; normally, however, it is a position on the staff where an instructor's instruction has been given (e.g., second measure of the phrase B) as shown in FIG. 2C or a blank space near that position on the staff.

For example, (a) if the user-touched position (marking position) is on the staff, data indicative of a time position on the staff determined by the touched coordinate position may be stored as data indicative of a time position on the musical score (display content) designated by the touch operation or marking operation (i.e., first user input). (b) If the user-touched position (marking position) is not on the staff but a blank space near the staff, a certain position on the staff closest to the touched coordinate position may be identified so that data indicative of a time position on the musical score (display content) designated by the touch operation or marking operation (first user input) is stored on the basis of the identified certain position. Further, (d) if the user-touched position (marking position) is not on the staff but a blank space near the staff or a suitable position on the screen, a predetermined reference position (e.g., a head position of the musical score, a head position of a given segment, such as a music passage or measure closest to the touched coordinate position, or the like) may be identified so that data indicative of a time position on the musical score (display content) designated by the touch operation or marking operation (first user input) is stored on the basis of the identified reference position. According to one embodiment, the coordinate position, on the screen, where the user performed the touch operation (marking operation) need not be so accurate because, after the touch operation or marking operation, it is possible to change or adjust relationship between the marking position (time position) in the musical score (display content) and the recording time of the voice to be associated with the marking position (time position). Further, (d) even where the user-touched position (marking position) is on the staff, the above-mentioned predetermined reference position (e.g., a head position of the musical score, a head position of a given segment, such as a music passage or measure closest to the touched coordinate position, or the like) rather than a time position on the staff corresponding accurately to the touched coordinate position may be identified so that data indicative of a time position on the musical score (display content) designated by the touch operation or marking operation (first user input) is stored on the basis of the identified position. Also, note that the time position on the musical score (display content) stored in response to the touch operation or marking operation and the displayed position of the voice memo icon (mark corresponding thereto) need not accurately match each other.

Next, let it be assumed that an instruction about the start of the selected music piece 31 has been received from the instructor following the instruction corresponding to the voice data V 1. Such instructing voice is shown as voice data V2 in FIG. 2B. If the user touches the head position (or a position near the head position) of the musical score, not only a voice memo icon V2 is displayed at the user-touched position but also time point T2 when the touch has been made (touch time T2) is detected and stored in association with the voice memo icon V2, so that the user can listen to the voice data V2 promptly after the end of the lessen.

In a resumed or second performance following the insertion of the instructor's instruction (V2), the user performs the first phrase A through to the last phrase D (A2 to D2). It is also assumed here that an instruction about how to end the selected music piece 31 has been received from the instructor. Such instructing voice is shown as voice data V3 in FIG. 2B. If the user touches an end position (or a position near the end position) of the musical score, not only a voice memo icon V3 is displayed at the user-touched position but also time point T3 when the touch has been made (touch time T3) is detected and stored in association with the voice memo icon V3, so that the user can listen to the voice data V3 promptly after the end of the lessen.

Then, in a resumed or third performance, the user performs again the last phrase D (D3). Then, the recording is stopped at time point T4.

If, after the end of the lessen following the insertion of the instructor's instruction (V3), the user wants to listen again to the recording, focusing particularly on any one of portions of the music performance instructed the instructor during the lessen, the user instructs the tablet terminal 1 to display on the touch panel 11 the musical score used in the lessen. In response to such a user's instruction, the screen 1 la having the voice memo icons V1 to V3 additionally displayed thereon as shown in FIG. 2C is displayed on the touch panel 11. Then, once the user instructs reproduction of the voice data V1 by touching the voice memo icon V1 of the voice memo icons V1 to V3 on the screen 11a, the CPU 10 starts reproduction of the recorded audio (voice) data at time point tl a predetermined time At before the touch time T1 stored in association with the voice memo icon V1. Normally, in the instant embodiment, the recorded audio (voice) data reproduction is stopped in response to a (reproduction) stop button (not shown) being touched. Also, the reproduction is automatically stopped once the reproduction proceeds to the end of the recorded voice data. The above description also applies to a case where the voice memo icon V2 or V3 has been touched to instruct reproduction of the audio (voice) data V2 or V3.

In the instant embodiment, content (instruction, comment or the like) which the user wants to record is recorded as voice instead of being input as letters/characters and signs on a displayed musical score as set forth above, and thus, the content (instruction, comment or the like) can be recorded by simple operations. Further, in the instant embodiment, recorded positions (recording times) and time positions (touched position) on a musical score are associated with each other, and thus, if, during the recording, the user touches, on the musical score, a desired portion which the user wants to listen to after the recording, the recorded content can be reproduced promptly from the desired portion.

Next, the control processing performed in the instant embodiment will be described in greater detail.

In the following description about the control processing, it is assumed that a musical score is being displayed as shown in FIG. 2C; note however that voice memo icons V1 to V3 have not yet been displayed on the musical score. Namely, the musical score of the selected music piece has already been displayed on the touch panel 11 in response to the user selecting, on the table terminal 1, the music piece for performance and instructing the tablet terminal 1 to display the musical score of the selected music piece. Note that, because displaying a musical score by use of musical score logic data (or musical score image data) on the touch panel 11 is a common practice, a description about a detailed method for displaying the musical score of the selected music piece is omitted here.

When the musical score is being displayed on the touch panel 11 of the tablet terminal 1, the tablet terminal 1 generally operates in any one of two operating states: a recording state where the tablet terminal 1 records ambient audio; and a recording stoppage state where the tablet terminal 1 records no ambient audio. Because the controlling processing differs between the currently recording state and the recording stoppage state, the following first describe the control processing during the recording state and then describe the control processing during the recording stoppage state.

Once the user touches the musical score displayed on the touch panel 11 or a position near the musical score, the CPU 10 proceeds to during-recording touch processing. FIG. 3 is a flow chart showing an example operational sequence of the during-recording touch processing.

Figure 3:
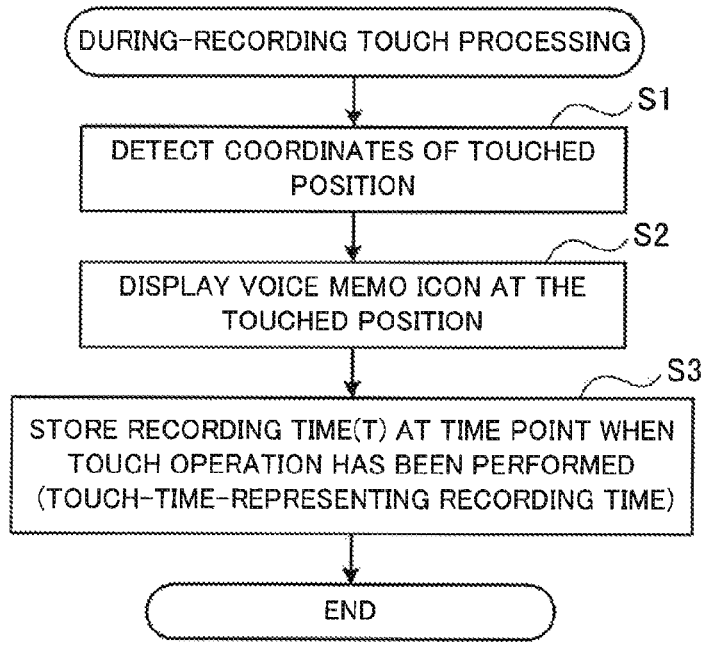
FIG. 3 is a flow chart showing an example operational sequence of a during-recording touch processing.

In FIG. 3, the CPU 10 first detects coordinates of the touched position on the touch panel 11, at step S1. Because the coordinates of the touched position on the touch panel 11 may be detected using a conventionally-known technique, a specific method for detecting the coordinates of the touched position will not be described here.

Then, the CPU 10 displays a voice memo icon on the touch panel 11 in connection with the detected touch position, at step S2. At this step, a process for identifying a time position on the musical score (display content) as necessary is also performed in the manner as set forth in items (a) to (d) above, and the voice memo icon is displayed in association with the identified time position on the musical score (display content). In this way, the voice memo icons V1 to V3 are displayed on the musical score; note, however, that one voice memo icon is displayed per touch. The voice memo icon may be displayed near the identified time position on the musical score (display content), rather than in accurate association with the designated time position on the musical score (display content). For example:

(1) a musical position (e.g., in what measure and in what beat) may be detected from a time position on the musical score identified in accordance with a touched position so that the voice memo icon is displayed at the detected musical position; or (2) from a time position on the musical score identified in accordance with a touched position, a note or rest near the time position is detected, and the voice memo icon is displayed at the position of the detected note or rest.

Further, if it has been determined, as a result of later-described editing, that a plurality of voice memo icons are to be allocated to a same or nearby time positions, these voice memo icons may be displaced at suitable intervals such that they are not displayed overlappingly with each other.

Then, the CU 10 detects a counted recording time (time information) at a time point when the touch operation has been performed (touch-time-representing recording time) and stores, at step S3, the detected recording time (T) into the memory 14 (specifically, the RAM in the memory 14) together with identification data of the voice memo icon in association with the time position on the musical score (display content) that has been identified in accordance with the detected touched position, after which the CPU 10 terminates the during-recording touch processing.

Upon start of recording, the CPU 10 instructs the timer 15 to start time counting so that a time elapsed from the start of the recording to the current time can be known. In response to the instruction from the CPU 10, the timer 15 starts time counting that lasts until the CPU 10 instructs the timer 15 to stop the time counting. Therefore, the CPU 10 can detect a measured recording time at a time point when a touch operation has been performed (i.e., touch-time-representing recording time by inquiring of the timer 15 the current counted time. Thus, in the illustrated example of FIG. 2B, time points T1 to T3 are stored in association with time positions in the musical score (display content) identified in accordance with individual touched positions (note, however, that one such recording time is stored per touch operation as stated above). It should be noted that a plurality of pieces of time information corresponding to a plurality of the touch processing may be put together into a single file and stored in the same area as the recorded audio data at the end of the recording. Alternatively, such time information may be stored embedded in the recorded audio data.

In the above general description of the control processing, the touch-time-representing recording time has been described as stored together with the identification data of the voice memo icon in association with the time position on the musical score (display content) that has been identified in accordance with the detected touched position. Alternatively, the storage of the identification data of the voice memo icon may be omitted. A coordinate position on the screen at which the voice memo icon is to be displayed can be identified on the basis of the stored time position on the musical score (display content). Even if it has been determined, as a result of the later-described editing, that a plurality of voice memo icons are to be allocated to a same time position, these voice memo icons can be distinguished from each other on the basis of a difference in the recording times associated therewith.

In the above general description of the control processing, the touch-time-representing recording time has been described as stored in association with the time position on the musical score (display content) that has been identified in accordance with the detected touched position. However, the present invention is not so limited, and coordinate data of the detected touched position (or coordinate data of a display position of the voice memo icon that is determined on the basis of the touched position) may itself be stored in association with the touch-time-representing recording time, which, although different in wording from the above, means the same as the touch-time-representing recording time being stored in association with the time position on the musical score (display content). Namely, the time position on the musical score (display content) that has been identified in accordance with the detected touched position is also identifiable by the coordinates of the display position on the screen of the corresponding voice memo icon.

In the during-recording touch processing of FIG. 3, execution, by the CPU 10, of a program module pertaining to step Si corresponds to receiving a first user input designating a desired time position on display content (musical score) displayed on the display device (screen 11a).

Further, in the during-recording touch processing of FIG. 3, execution, by the CPU 10, of a program module pertaining to step S2 corresponds to adding, to the display content (musical score) displayed on the display (screen 11a), a mark (voice memo icon) related to the time position designated by the first user input.

Further, in the during-recording touch processing of FIG. 3, execution, by the CPU 10, of a program module pertaining to step S3 corresponds to storing 1) the recording time of the input voice (audio) based on the time point when the first user input has been received and 2) the time position on the display content (musical score) designated by the first user input into the storage device (i.e., the RAM in the memory 14) in association with each other.

Then, once the user touches the musical score or a position near the musical score during stoppage of recording, the CPU 10 proceeds to during-recording-stoppage touch processing. FIG. 4 is a flow chart showing an example operational sequence of the during-recording-stoppage touch processing.

Figure 4:
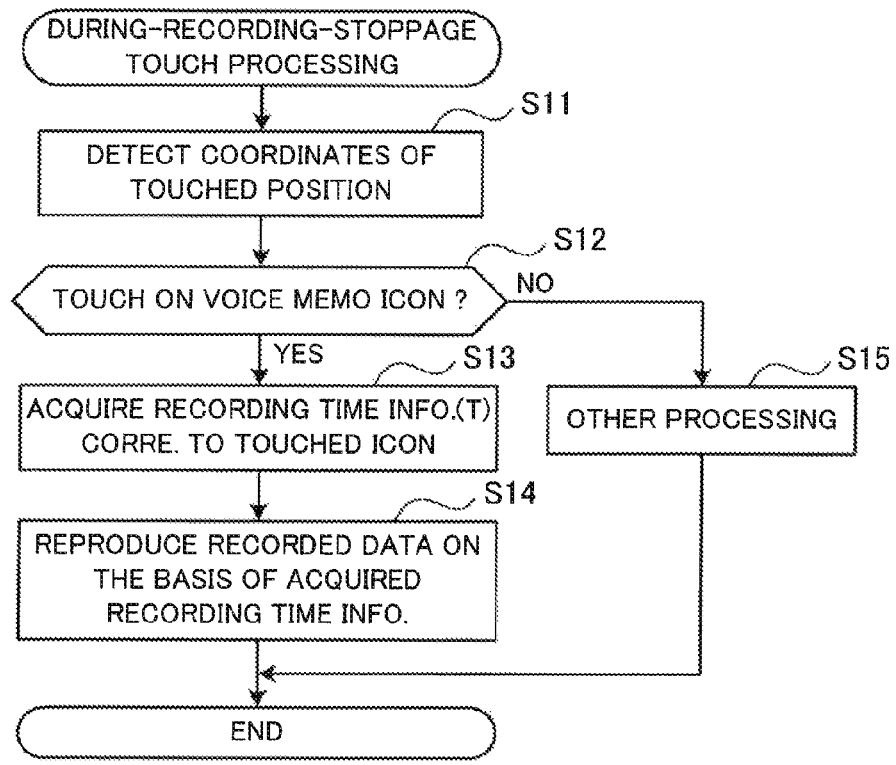
FIG. 4 is a flow chart showing an example operational sequence of a during-recording-stoppage touch processing.

In FIG. 4, the CPU 10 first detects coordinates of the touched position on the touch panel 11 at step S11 in the same manner as at step S1 of FIG. 3.

Then, at step S12, the CPU 10 determines, on the basis of the detected coordinates of the touched position, whether the user's touch operation is on any one of the voice memo icons. If the result of the determination at step S12 shows that the user's touch operation is on any one of the voice memo icons, the CPU 10 moves on to step S13, while, if the result of the determination at step S12 shows that the user's touch operation is not on any one of the voice memo icons, the CPU 10 branches to step S15.

At step S13, the CPU 10 acquires, from the memory 14 (RAM in the memory 14), recording time information corresponding to the touched voice memo icon. Once one voice memo icon is identified as above, information stored as the touch-time-representing recording time, i.e. one piece of recorded voice time information, too is identified, and thus, the CPU 10 reads out and acquire the recording time information from the memory 14.

After that, the CPU 10 reproduces voice (audio) data based on the acquired recording time information at step S14, and then, the CPU 10 terminates the during-recording-stoppage touch processing of FIG. 4. In the instant embodiment, an actual time at which the reproduction of the voice (audio) data is started is the predetermined time Δt before the time indicated by the above-mentioned recorded voice time information acquired at step S13, i.e. the predetermined time Δt before the recording time (information), as described above in the general description of the control processing. For example, when the user has touched the voice memo icon V1 within the screen 11a of FIG. 2C, reproduction of the voice data is started at time point tl the predetermined time Δt before time point T1 of FIG. 2B. The reason why the reproduction start position is shifted to before the touch-time-representing recording time is that, because the user first listens to the instructor's voice instruction for a while and then determines whether or not to make a marking with a view to later listening again to the instructor's instruction, the reproduction would often be started halfway through the instruction if the reproduction is started at the recording time representing the touch operation (marking operation).

In the instant embodiment, the above-mentioned predetermined time Δt is only one fixedly-set time that, in accordance with a reproduction instruction for each of voice memo icons, is applied uniformly to the corresponding touch-time-representing recording time. However, the present invention is not so limited, and the predetermined time Δt may be freely changed as desired by the user. For instance, a time point when the audio recording shifts from a music performance to an instructor's instruction, a boundary between adjoining instructor's instructions or the like may be automatically detected using, for example, a conventionally-known voice recognition technique, and a predetermined time Δt may be determined individually on the basis of a result of the detection and then stored in association with the corresponding voice memo icon. In such a case, the time by which the reproduction start position is shifted to before the touch-time-representing recording time differs in width (length) among individual selected voice memo icons.

At step S15, the CPU 10 performs other processing, such as:

reproducing music piece data corresponding to the displayed musical score in response to an operation of a reproduction button;

stopping reproduction of currently-reproduced music piece data or voice (audio) data in response to an operation of the reproduction button;

displaying a next or preceding page of the displayed musical score in response to a score page turning operation; and inputting or deleting a note, mark or the like to or from the displayed musical score in response to a score editing operation.

Upon completion of the other processing, the CPU 10 terminates the during-recording-stoppage touch processing.

Whereas the foregoing have described the processing in relation to the case where the performance lessen, which is performed with reference to the musical score displayed on the basis of the selected music piece of FIG. 2A, has been recorded once, the following describe a case where the performance lessen performed with reference to the same musical score has been recorded a plurality of times.

Figure 5:
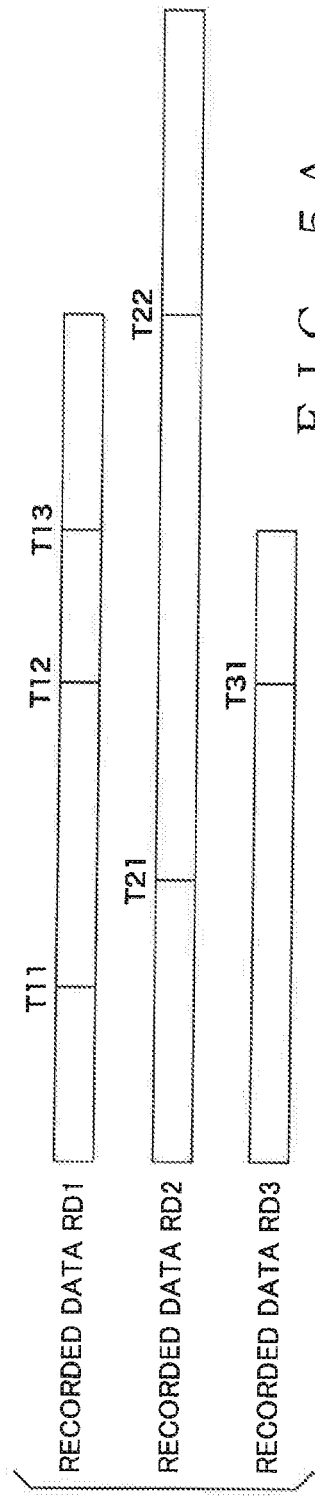
FIG. 5A is a diagram showing an example of data recorded when recording based on the musical score of FIG. 2 has been performed a plurality of times and an example of recording times related to time positions designated by user's inputs (touches on the screen)
FIG. 5B is a diagram showing relationship between touched positions (time positions on display content designated by the user's input) in the illustrated example of FIG. 5A and the recording times related to or associated with the touched positions.

FIG. 5A shows an example of data RD1 to RD3 recorded when the performance lessen, performed with reference to the musical score displayed on the basis of the selected music piece of FIG. 2A has been recorded three times, and FIG. 5B shows an example of information recorded in response to user's touch operations on the musical score displayed during the individual recording.

In FIG. 5A, the first to third recorded data RD1 to RD3 are data recorded by the three recording and then stored, for example, in the memory 14. During the recording of the first recorded data RD1, three user's touch operations are performed whose touch times are indicated by "T11", "T12" and "T13", respectively, in FIG. 5B. During the recording of the second recorded data RD2, two user's touch operations are performed whose touch times are indicated by "T21" and "T22", respectively, in FIG. 5B. Further, during the recording of the third recorded data RD3, one touch operation is performed whose touch time is indicated by "T31" in FIG. 5B.

The information recorded in response to user's touch operations comprises coordinate position information indicative of touched coordinate positions on the musical score during the recording of the recorded data RD1 to RD3 and recording times (touch times) corresponding to the touched coordinate positions. Such information too is stored, for example, in the memory 14. Once a touch operation is performed by the user, the during-recording touch processing of FIG. 3 is started up as set forth above, so that, in relation to the recorded data, a time position on the musical score identified in accordance with the coordinates of the touched position and the touch-time-representing recording time (touch time) are recorded in association with each other (steps S1 and S3) and the above information (touched position and touch time) of FIG. 5B is added depending on the number of touch operations performed. In the illustrated example of FIG. 5B, reproduction start positions (times) earlier by the predetermined time Δt (see FIG. 2B) than the corresponding touch times are also recorded. Thus, any one of the reproduction start positions can be determined with mere reference to the recorded information, so that the reproduction process (at step S14 of FIG. 4) can be performed with ease.

Whereas the coordinate position on the musical score touched during the recording is itself recorded in association with the corresponding recording time in the illustrated example of FIG. 5B, a musical position on the musical score (i.e., time position on the musical score (display content), identified in accordance with the detected touched position) rather than such coordinates may be stored, as noted above.

Once the user instructs readout of any one of the recorded data RD1 to RD3 stored in the memory 14, the instructed recorded data is read out to a working area of the RAM, the touched position and touch time information corresponding to the read-out recorded data are read out with reference to FIG. 5B, and, thus, the voice memo icon is displayed at coordinates corresponding to the touched position on the touch panel 11 as noted above. Once the user touches any one of the displayed voice memo icons, the recorded data corresponding to the touched voice memo icon is reproduced on the basis of the recording time associated with the touched voice memo icon, so that the user can promptly listen to a desired portion of the recorded data.

Figure 6:
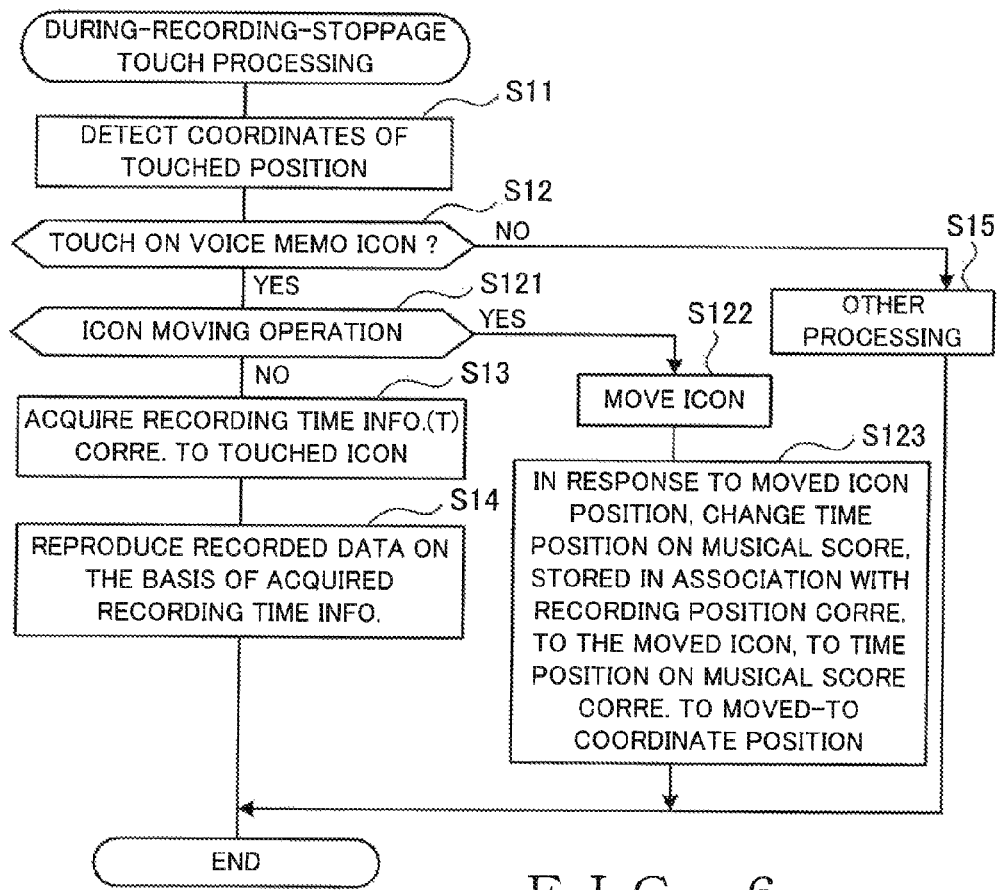
FIG. 6 is a flow chart showing a modification of the during-recording-stoppage touch processing shown in FIG. 4.

Next, with reference to FIG. 6, a description will be given about an example operational sequence of editing processing which allows the display position of any one of the voice memo icons to be changed as desired. FIG. 6 shows a modification of the during-recording-stoppage touch processing of FIG. 4, where step S121 is inserted between steps S12 and S13 and where steps S122 and S123 are provided on a YES branch of step S121. The operations of steps S11 to S15 in FIG. 6 are identical to the aforementioned operations of the same step Nos. in FIG. 4. At step S121, the CPU 10 makes a determination as to whether a touch on a particular voice memo icon is a predetermined icon moving operation, such as a drag operation, i.e. an operation of sliding a finger, having touched the icon, without releasing the finger off the screen. With a NO determination at step S121, the CPU 10 goes to steps S13 and S14, where reproduction of the recorded data is executed in the aforementioned manner. If the touch on the voice memo icon is a predetermined icon moving operation as determined at step S121 (YES determination at step S121), on the other hand, the CPU 10 goes to step S122, where the voice memo icon is moved to a display position corresponding to the predetermined icon moving operation. Then, at step S123, the time position on the musical score, stored in the memory 14 (RAM in the memory 14) in association with the recording time corresponding to the moved voice memo icon, is changed to a time position on the musical score corresponding to coordinates of the moved-to display position. In this way, the coordinate position (i.e., time position on the musical score) at which the particular voice memo icon is displayed can be changed as desired without involving change in the recording time, i.e. content (instruction or comment), of the corresponding voice (audio) data. Thus, when the user has to hastily perform a touch operation (first user input) for marking on input voice (audio) in real time, and even if a marking position (touched position) made by the user at that time is not accurate, subsequent editing allows the input voice (audio) to be associated with a more proper time position on the musical score.

In the aforementioned editing processing of FIG. 6, execution, by the CPU 10, of a program module pertaining to step S121 corresponds to receiving a second user input (moving operation, such as a drag operation) for moving the position of the added mark (voice memo icon) to a different time position on the display content (musical score) displayed on the display device (screen 11a). As an example, the second user input may include dragging the above-mentioned mark (voice memo icon) on the screen of the display device.

Further, execution, by the CPU 10, of a program module pertaining to steps S122 and S123 corresponds to changing, in response to movement of the position of the mark (voice memo icon), the relationship or association stored in the memory 14 (RAM in the memory 14) such that the recording time of the input voice based on the time point when the first user input has been received is associated with the time position moved by the second user input (i.e., input for moving the position of the added mark (voice memo icon) to a different time position on the display content (musical score).

Figure 7:
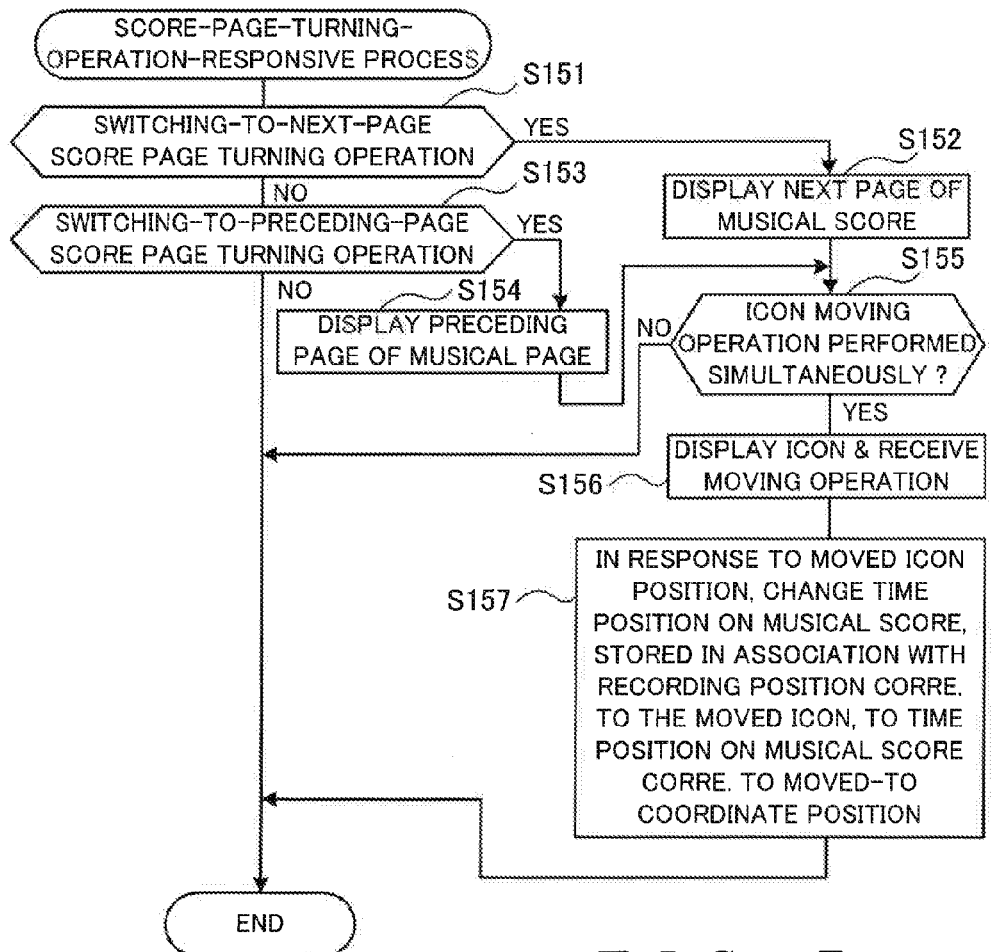
FIG. 7 is a flow chart showing an example operational sequence of a score-page-turning-operation-responsive process included in other processing shown in FIGS. 4 and 6.

FIG. 7 is a flow chart of the process that may be performed in the "other processing" of step S15 in response to a score page turning operation (i.e., score-page-turning-operation-responsive process). The score page turning operation is an operation for turning pages of the musical score (display content) in the case where the musical score consists of a plurality of pages and a portion of (i.e., one or more pages less than all of) the pages is displayable at a time on the screen 11a. Typically, the score page turning operation is an operation for switching one page of the musical score (display content) currently displayed on the screen 11a to a succeeding (next) or to a preceding page. At step S151, the CPU 10 determines whether a touch operation on a desired position of the screen 11a is a predetermined score page turning operation for switching to the next page (i.e., switching-to-next-page score page turning operation). With a YES determination at step S151, the CPU 10 goes to step S152, where the page of the musical score (display content) currently displayed on the screen 11a is switched to the next page. With a NO determination at step S151, on the other hand, the CPU 10 moved on to step S153 to further determine whether the touch operation on the desired position of the screen 11a is a predetermined score page turning operation for switching to the preceding page (i.e., switching-to-preceding-page score page turning operation). With a YES determination at step S153, the CPU 10 goes to step S154, where the page of the musical score (display content) currently displayed on the screen 11a is switched to the preceding page. As an example, the switching-to-next-page score page turning operation comprises sliding a finger, having touched a desired position other than the voice memo icons (and other movable display objects) of the screen 11a, in a leftward lateral direction by more than a predetermined amount while still keeping the finger in touch with the screen 11a. On the other hand, the switching-to-preceding-page score page turning operation comprises sliding a finger, having touched a desired position other than the voice memo icons (and other movable display objects) of the screen 11a, in a rightward lateral direction by more than a predetermined amount while still keeping the finger in touch with the screen 11a. Of course, any other suitable touch operations may be employed as the switching-to-next-page score page turning operation and the switching-to-preceding-page score page turning operation. As another alternative, a desired page No. to be displayed on the screen 11a may be designated directly instead of such touch operations being performed.

At next step S155, the CPU 10 determines whether a voice memo icon moving operation has been performed simultaneously with the score page turning operation. For example, if, with a particular one of the voice memo icons kept touched by a finger of the user, the user has performed the page turning operation with another finger, it is determined at step S155 that a voice memo icon moving operation has been performed on the touched voice memo icon simultaneously with the score page turning operation. With a YES determination at step S155, the CPU 10 goes to steps S156 and S157. At step S156, the particular voice memo icon for which the memo icon moving operation has been performed is displayed at a suitable position of the screen 11a currently displaying the switched-to page. Also, at step S156, the CPU 10 further receives the user's voice memo icon moving operation (drag operation) to further move the voice memo icon to a display position corresponding to the received icon moving operation. At next step S157, the time position on the musical score, stored in the memory 14 (RAM in the memory 14) in association with the recording time corresponding to the moved voice memo icon, is changed to a time position on the musical score corresponding to coordinates of the moved-to display position, in a similar manner to step S123 above.

In this way, the coordinate position (i.e., time position on the musical score) at which the particular voice memo icon is displayed can be changed as desired without involving change in the recording time, i.e. content (instruction or comment), of the corresponding voice data. Thus, even where the musical score consists of a plurality of pages, when the user has to hastily perform a touch operation (first user input) for marking on input voice (audio) in real time, and even if a user's marking position (touched position) at that time is not accurate, subsequent editing allows the input voice to be associated with a more proper time position on a page of the musical score.

In the aforementioned process of FIG. 7, execution, by the CPU 10, of a program module pertaining to steps S151 to S154 corresponds to the second user input including an input (sliding operation in the rightward or leftward lateral direction) for switching the page of the display content (musical score) displayed on the screen 11a of the display device to another page. Further, execution, by the CPU 10, of a program module pertaining to step S155 corresponds to the second user input including an input for switching the position of the added mark (voice memo icon) to a desired time position on the switched-to page.

Further, in the process of FIG. 4, execution, by the CPU 10, of a program module pertaining to steps S11 and S12 corresponds to receiving a third user input for selecting a time position on the display content (musical score). Furthermore, execution, by the CPU 10, of a program module pertaining to steps S13 and S14 corresponds to reproducing the recorded voice (audio) on the basis of the recording time associated with the time position on the display content selected by the third user input.

Figure 8:
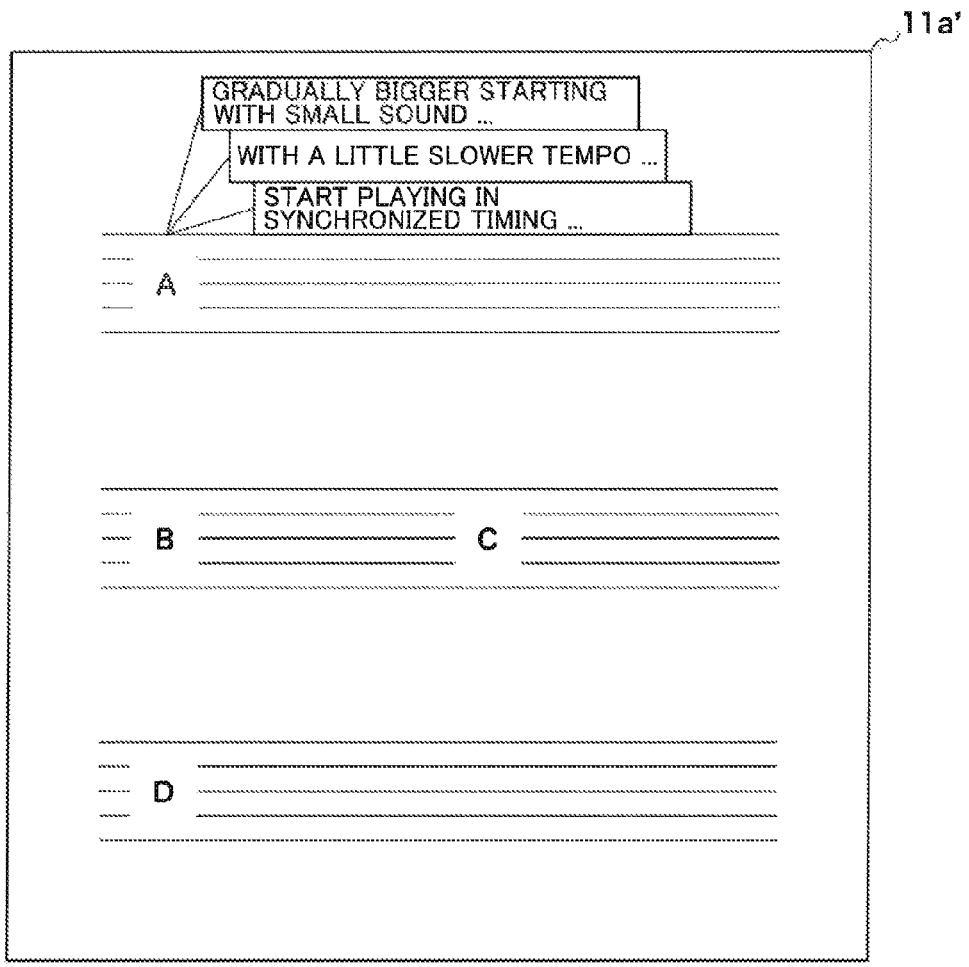
FIG. 8 is a diagram showing an example of a screen of the touch panel where audio comments are displayed in letters/characters at a touched position on the displayed musical score on a touch panel of FIG. 1.

Note that, whereas the instant embodiment has been described above as displaying a voice memo icon at a touched position on the displayed musical score through the during-recording touch processing of FIG. 3, the present invention is not so limited and content of voice utterance may be displayed in letters/characters at the touched position on the musical score. FIG. 8 is a diagram showing an example of a screen 11a' displayed on the touch panel 11 in such a modification. If content of voice utterance can be displayed in letters/characters, the content of voice utterance which the user wants to reproduce can be readily identified when a plurality of touch operations have been performed on a same position of the musical score. Conversion of the content of voice utterance into letters/characters may be performed using a conventionally-known voice recognition technique. Further, a start point of the conversion of the voice utterance into letters/characters in the recorded data may be set at a time point the predetermined time Δt before the touch-time-representing recording time. Alternatively, a suitable time point near that time point the predetermined time ΔAt before the touch-time-representing recording time may be detected, and the conversion of the voice utterance into letters/characters may be started at the detected suitable time point. Furthermore, the voice utterance thus converted into letters/characters may be constructed to be freely editable by the user.

Further, whereas the foregoing description about the instant embodiment has made no particular reference to preservation of recorded data, i.e. voice (audio) data stored in the recorded data storage area, all of the recorded voice data may be preserved in the flash memory, or only a portion of the recorded voice data corresponding to a user-touched position on the musical score may be extracted and preserved with the remaining portion deleted. The latter preservation scheme is advantageous in that it can significantly reduce the quantity of the data to be preserved. Further, in the latter case, whereas a start point of the preserved data may be set at a time point the predetermined time At before the touch-time-representing recording time, an end point of the preserved data is preferably determined, for example, by:

the user designating the end point manually:

setting, as the end point, a time point a predetermined time (e.g., 10 sec.) after the start point (the predetermined time may be fixedly determined in advance or may be changed freely by the user); or setting, as the end point, an end point of voice utterance detected with a conventionally-known voice recognition technique.

Further, whereas the instant embodiment has been described above in relation to the case where a time elapsed from the start point of recording is stored as the touch-time-representing recording time, the present invention is not so limited, and, if the apparatus has a clock function or can know the current time by, for example, inquiring of a server, the current time at which the touch operation has been performed may be stored. More specifically, in such a case, "date, start time and end time of recording" may be stored in association with voice data, and "date of recording and touch time" are stored as touch-time-representing recording time. If the touch time is 10:10:30 of a given date for given audio data whose recording was been started at 10:00:15 of the given date, then an elapsed record time can be calculated as 10 min and 15 sec. Thus, even where the elapsed recording time till the touch time is not stored, the recorded data can be reproduced on the basis of the calculated elapsed recording time.

Furthermore, whereas the instant embodiment has been described as performing both recording of ambient audio and displaying of a musical score by means of a single apparatus, the present invention is not so limited, and recording of ambient audio and displaying of a musical score may be performed by means of separate apparatus, i.e. a recording apparatus and a display apparatus. With such arrangements, the necessary operations can be shared between two or more persons, e.g. a human player performing operations on a musical score displayed on the display apparatus and a teacher or instructor operating the recording apparatus, such as an IC recorder, to record ambient audio including instructions (instructor's voice).

Let it be assumed that the recording apparatus and the display apparatus are connected to a server via a network. Once the human operator of the recording apparatus instructs the recording apparatus to start recording, the recording apparatus transmits a status "now recording" to the display apparatus via the network. Audio data being recorded is transmitted from the recording apparatus via the network to the server for storage therein. Namely, in this case, the server functions as a storage device for storing the audio data. Once the human operator of the display apparatus touches a desired position on the display screen of the display apparatus when the status is "now recording", the display apparatus transmits time information indicative of the time of the touch operation to the server via the network. The server stores such time information after conversion into an elapsed time in the audio data. Alternatively, the audio data itself may be managed temporally by a date and time as above rather than by an "elapsed time from the start of the recording".

Once the human operator of the recording apparatus instructs the recording apparatus to stop recording, the recording apparatus transmits a status "now not recording" to the display apparatus via the network. Once the human operator of the display apparatus touches a desired voice memo icon on the display screen of the display apparatus when the status is "now not recording", the display apparatus acquires the audio data from the server and starts reproducing the acquired audio data at a suitable position on the basis of the time information associated with the touched voice memo icon.

Note that, because the human player and the instructor are in the same space, the recording apparatus and the display apparatus can be synchronized with each other by verbal and/or eye contact between the human operator of the display apparatus (i.e., one of the human player and the instructor) and the human operator of the recording apparatus (i.e., the other of the human player and the instructor) even where the recording apparatus and the display apparatus are not interconnected via a network. When given calling voice, the human operator of the display apparatus switches the display apparatus to a "recording mode" so as to permit measurement of elapsed times and addition of a voice memory icon. When given calling voice, the human operator of the recording apparatus instructs the recording apparatus to start recording. In this way, the display apparatus and the recording apparatus can measure common or same elapsed times.

If, after the recording, the human operator of the display apparatus copies the audio data recorded in a memory of the recording apparatus to the display apparatus, the human operator of the display apparatus can start reproducing the audio data at a proper time position by touching a particular voice memo icon on the display apparatus.

The aforementioned examples are useful particularly in cases where a plurality of human players perform under one instructor. It suffices that the instructor give instructions to each of the human players and each of the human players store only instructions given to him or her by touching a musical score displayed on the display apparatus.

Further, in the case where the single apparatus is divided into a recording apparatus and a display apparatus, the recording apparatus may be a video recording apparatus rather than an audio recording apparatus so that moving images are recorded instead of audio being recorded. Recording of such moving images may be entrusted to a dedicated cameraman, and the human player (user) may perform only touch operations on a displayed musical score.

Furthermore, the present invention is applicable to other fields than music. The information displayed on the display apparatus is not limited to information indicative of content of a music performance and may be any other information, such as ordinary text, picture, map or illustration. For example, if conversations in a conference among a plurality of persons are recorded and desired positions of text, picture or the like are designated and marked in accordance with content of conversations, the content of conversations can be listened again starting with any one of the marked positions promptly after the conference, and thus, there is no need to create minutes (i.e., official record of the proceedings of the conference).

Whereas the above-described embodiment is constructed to display a musical score on the touch panel 11 and allow an operation to be performed directly on the displayed musical score, the present invention is not so limited, and a display device other than the touch panel may be employed so that a musical score is displayed on that display device. In such a case, a position on the displayed musical score may be designated via a pointing device, such as a mouse, or by a numeral (e.g., measure No. or number of beats) being input via a numerical keypad.

It should be appreciated that the object of the present invention can also be accomplished by supplying a system or apparatus with a storage medium having stored therein program codes of software implementing the functions of the above-described embodiment so that a computer (e.g., CPU, MPU or the like) of the system or apparatus reads out and executes the program codes stored in the storage medium.

In such a case, the program codes read out from the storage medium themselves implement the functions of the present invention, and these program codes and the storage medium having stored there in the program codes together implement the present invention.

Furthermore, the storage medium for supplying the program codes may be, for example, a flexible disk, hard disk, magneto-optical disk, CD-ROM, CD-R, CD-RW, DVD-ROM, DVD-RAM, DVD-RW, DVD+RW, magnetic tape, non-volatile memory card, ROM or the like. As an alternative, the program codes may be downloaded from a server computer via a communication network.

Moreover, instead of the functions of the above-described embodiment of the present invention being implemented by a computer reading out and executing the program codes, the functions of the above-described embodiment of the present invention may of course be implemented by an OS (operating system) and the like, running on the computer, performing a part or whole of the actual processing on the basis of the instructions of the program codes.

Furthermore, needless to say, the program codes, read out from the storage medium, may be written into a memory provided on a function extension board inserted in the computer or on a function extension unit connected to the computer so that the functions of the above-described embodiment can be implemented by a CPU and the like, provided on the function extension board or the function extension unit, performing a part or whole of the actual processing on the basis of the instructions of the program codes.

This application is based on, and claims priority to, JP PA 2013-126436 filed on 17 Jun. 2013. The disclosure of the priority application, in its entirety, including the drawings, claims, and the specification thereof, are incorporated herein by reference.

What is claimed is:

1. A computer-implemented method comprising:
   displaying, on a display device, display content representative of a temporal transition of a music performance;
   recording input audio;
   receiving, during recording of the input audio, a first user input designating a desired time position on the display content displayed on the display device;
   storing, into a storage device, a recording time of the input audio based on a time point at which the first user input has been received and the time position on the display content designated by the first user input, in association with each other; and
   adding, to the display content displayed on the display device, a mark related to the time position designated by the first user input.

2. The method as claimed in claim 1, which further comprises:
   receiving a second user input for moving a position of the mark, added to the display content displayed on the display device, to a different time position; and
   changing, in response to movement of the position of the mark, association between the recording time and the time position, stored in the storage device, so that the recording time of the input audio, based on the time point at which the first user input has been received, is associated with the time position moved by the second user input.

3. The method as claimed in claim 2, wherein the second user input includes dragging the mark on a screen of the display device.

4. The method as claimed in claim 2, wherein the display content comprises a plurality of pages, a portion of the plurality of pages being displayable at a time on the screen of the display device, and
   the second user input includes an input for switching a page of the display content, displayed on the screen of the display device, to another page and an input for moving the position of the added mark to a desired time position on a switched-to page of the display content.

5. The method as claimed in claim 1, which further comprises:
   receiving a third user input for selecting the time position on the display content; and
   reproducing the recorded audio on a basis of the recording time associated with the time position on the display content selected by the third user input.

6. The method as claimed in claim 5, wherein said reproducing the recorded audio includes starting reproduction of the recorded audio at a recorded position a predetermined time before the recording time associated with the time position on the display content selected by the third user input.

7. A display apparatus comprising:
a display device:
a storage device; and
a processor configured to:
- display, on the display device, display content representative of a temporal transition of a music performance;
- record input audio into the storage device;
- receive, during recording of the input audio, a first user input designating a desired time position on the display content displayed on the display device;
- store, into the storage device, a recording time of the input audio based on a time point at which the first user input has been received and the time position on the display content designated by the first user input, in association with each other; and
- add, to the display content displayed on the display device, a mark related to the time position designated by the first user input.

8. The display apparatus as claimed in claim 7, wherein said processor is further configured to:
- receive a second user input for moving a position of the mark, added to the display content displayed on said display device, to a different time position; and
- change, in response to movement of the position of the mark, association between the recording time and the time position, stored in said storage device, so that the recording time of the input audio, based on the time point at which the first user input has been received, is associated with the time position moved by the second user input.

9. The display apparatus as claimed in claim 8, wherein the second user input includes dragging the mark on a screen of said display device.

10. The display apparatus as claimed in claim 8, wherein the display content comprises a plurality of pages, a portion of the plurality of pages being displayable at a time on the screen of said display device, and
the second user input includes an input for switching a page of the display content to be displayed on the screen of said display device, and an input for moving the position of the added mark to a desired time position on a switched-to page of the display content.

11. The display apparatus as claimed in claim 7, wherein said processor is further configured to:
- receive a third user input for selecting the time position on the display content; and
- reproduce the recorded audio on a basis of the recording time associated with the time position on the display content selected by the third user input.

12. The display apparatus as claimed in claim 11, wherein said processor is further configured to, for reproducing the recorded audio, starting reproduction of the recorded audio at a recorded position a predetermined time before the recording time associated with the time position on the display content selected by the third user input.

13. A display apparatus comprising:
a display screen configured to display content representative of a temporal transition of a music performance:
a storage section configured to record input audio;
a user interface section configured to receive, during recording of the input audio, a first user input designating a desired time position on the display content displayed on said display device;
a control section configured to store a recording time of the input audio based on a time point at which the first user input has been received and the time position on the display content designated by the first user input, in association with each other; and
a display control section configured to add, to the display content displayed on the display screen, a mark related to the time position designated by the first user input.

14. A non-transitory computer-readable storage medium storing a program executable by a computer for performing a method for displaying and recording, said method comprising:
- displaying, on a display device, display content representative of a temporal transition of a music performance;
- recording input audio;
- receiving, during recording of the input audio, a first user input designating a desired time position on the display content displayed on the display device;
- storing, into a storage device, a recording time of the input audio based on a time point at which the first user input has been received and the time position on the display content designated by the first user input, in association with each other; and
- adding, to the display content displayed on the display device, a mark related to the time position designated by the first user input.

* * * * *